(12) United States Patent
Jung et al.

(10) Patent No.: US 8,588,812 B2
(45) Date of Patent: Nov. 19, 2013

(54) METHOD FOR DETECTING CSG CELLS IN WIRELESS COMMUNICATION SYSTEM AND APPARATUS THEREFOR

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/499,280

(22) PCT Filed: Nov. 2, 2010

(86) PCT No.: PCT/KR2010/007630
§ 371 (c)(1),
(2), (4) Date: Mar. 29, 2012

(87) PCT Pub. No.: WO2011/053083
PCT Pub. Date: May 5, 2011

(65) Prior Publication Data
US 2012/0208556 A1    Aug. 16, 2012

Related U.S. Application Data

(60) Provisional application No. 61/257,427, filed on Nov. 2, 2009.

(30) Foreign Application Priority Data

Nov. 1, 2010    (KR) .................. 10-2010-0107730

(51) Int. Cl.
*H04W 24/00*    (2009.01)

(52) U.S. Cl.
USPC .............. 455/456.1; 455/456.6; 455/440; 455/452.2; 370/232; 370/331; 370/346

(58) Field of Classification Search
None
See application file for complete search history.

(56) References Cited

U.S. PATENT DOCUMENTS

| 2009/0239533 | A1 | 9/2009 | Somasundaram et al. |
| 2009/0270092 | A1 | 10/2009 | Buckley et al. |
| 2009/0270096 | A1 * | 10/2009 | Somasundaram et al. ..... 455/434 |
| 2010/0069086 | A1 * | 3/2010 | Ahlin ........................ 455/456.1 |
| 2010/0297955 | A1 * | 11/2010 | Marinier et al. ............... 455/73 |
| 2010/0323633 | A1 * | 12/2010 | Pani et al. ................. 455/67.14 |

* cited by examiner

*Primary Examiner* — Marcos Batista
*Assistant Examiner* — Keith Fang
(74) *Attorney, Agent, or Firm* — Lee, Hong, Degerman, Kang & Waimey

(57) ABSTRACT

The present invention relates to a method for detecting closed subscriber group (CSG) cells through a terminal in a wireless communication system. The method for detecting the CSG cells in the wireless communication system comprises the steps of: determining a present position of the terminal; measuring a physical layer identifier of a corresponding cell when the present position of the terminal corresponds to a position of a prestored CSG cell; and detecting the corresponding cell as the priorly connected CSG cell when the measured physical layer identifier corresponds to the physical layer identifier of the prestored CSG cell. Desirably, the method further comprises the steps of measuring system information of the corresponding cell; and detecting the corresponding cell as the priorly connected CSG cell when the upper layer cell identifier included in the system information corresponds to the upper layer cell identifier of the prestored CSG cell.

10 Claims, 11 Drawing Sheets

FIG. 4
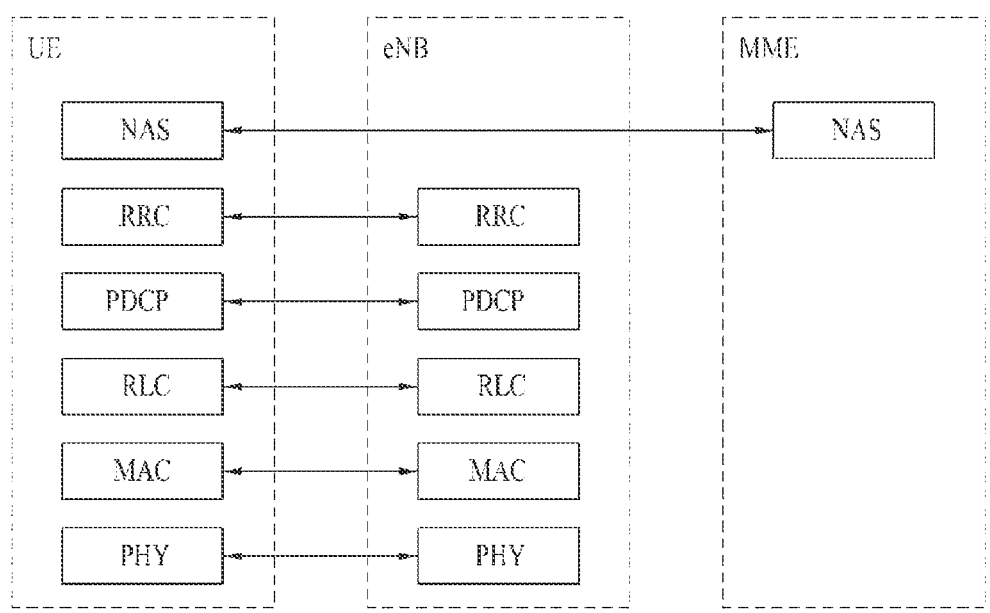
(a) control-plane protocol stack
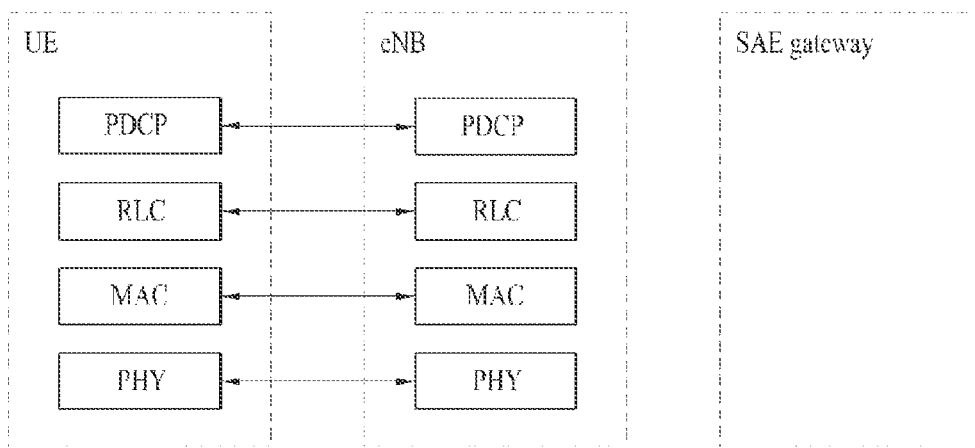
(b) user-plane protocol stack

METHOD FOR DETECTING CSG CELLS IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2010/007630, filed on Nov. 2, 2010, which claims the benefit of earlier filing date and right of priority to Korean Application No. 10-2010-0107730, filed on Nov. 1, 2010, and also claims the benefit of U.S. Provisional Application Ser. No. 61/257,427, filed on Nov. 2, 2009, the contents of which are all incorporated by reference herein in their entirety.

TECHNICAL FIELD

The present invention relates to a wireless communication system, and more particularly, to a method for detecting CSG cells in a wireless communication system and an apparatus therefor.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system.

Referring to FIG. 1, the E-UMTS includes a User Equipment (UE), base stations (eNode B and eNB), and an Access Gateway (AG) which is located at an end of a network (E-UTRAN) and connected to an external network. Generally, the base stations may simultaneously transmit multiple data streams for a broadcast service, a multicast service and/or a unicast service. An interface for transmitting user traffic or control traffic may be used between cells.

The access gateway (AG) may be divided into a portion for processing user traffic and a portion for processing control traffic. At this time, a new interface may be used for communication between the access gateway for processing user traffic and the access gateway for processing control traffic. Also, the access gateway manages mobility of a user equipment on a Tracking Area (TA) basis, wherein one TA includes a plurality of cells. If the user equipment moves from a specific TA to another TA, it notifies the access gateway that the TA where the user equipment is located has been changed.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations.

A Core Network (CN) may include the access gateway (AG) and a network node or the like for user registration of the user equipment. An interface for identifying the E-UTRAN from the core network may be used.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). In this specification, this technology will be referred to as "LTE-Advanced" or "LTE-A." One of important differences between the LTE system and the LTE-A system is difference in system bandwidth. The LTE-A system aims to support a wideband of maximum 100 MHz.

DISCLOSURE

Technical Problem

An object of the present invention devised to solve the conventional problem is to provide a method for detecting CSG cells in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for detecting closed subscriber group (CSG) cells in a wireless communication system comprises the steps of determining a current position of a user equipment; measuring a physical layer identifier of a corresponding cell when the current position of the user equipment corresponds to a position of a CSG cell, which is previously stored; and detecting the corresponding cell as a CSG cell, which is previously accessed, when the measured physical layer identifier corresponds to a physical layer identifier of the previously stored CSG cell.

Preferably, the step of detecting the corresponding cell as a cell which is previously accessed includes measuring system information of the corresponding cell; and detecting the corresponding cell as the previously accessed CSG cell when an upper layer cell identifier included in the system information corresponds to the upper layer cell identifier of the previously stored CSG cell.

More preferably, the method further comprises the step of storing at least one of the physical layer identifier of the CSG cell and the upper layer cell identifier together with position information of the CSG cell if the user equipment accesses the CSG cell in accordance with a request of a user.

To solve the aforementioned technical problems, according to another aspect of the present invention, a user equipment in a wireless communication system comprises a wireless communication module for transmitting and receiving a signal from a peripheral cell; and a processor comparing a current position of the user equipment with a position of a CSG cell, which is previously stored, and measuring a physical layer identifier of the peripheral cell, wherein the processor determines whether the measured physical layer identifier is the same as a physical layer identifier of the previously stored CSG cell when the current position of the user equipment corresponds to the position of the previously stored CSG cell, and detecting the corresponding cell as a CSG cell, which is previously accessed, when the measured physical layer identifier is the same as the physical layer identifier of the previously stored CSG cell.

Preferably, the processor measures system information of the corresponding cell, and detects the corresponding cell as the previously accessed CSG cell when an upper layer cell identifier included in the system information is the same as the upper layer cell identifier of the previously stored CSG cell.

More preferably, the processor stores at least one of the physical layer identifier of the CSG cell and the upper layer cell identifier together with position information of the CSG cell if the user equipment accesses the CSG cell in accordance with a request of a user.

Meanwhile, the physical layer identifier includes either physical cell ID (PCI) or primary scrambling code (PSC), and the upper layer cell identifier includes a cell identifier recognized through a radio resource control (RRC) layer.

Advantageous Effects

According to the embodiments of the present invention, in a wireless communication system, a user equipment can more effectively detect a CSG cell.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 4 is a diagram illustrating structures of a control plane and a user plane of a radio interface protocol between a user equipment and E-UTRAN based on the 3GPP radio access network standard;

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following description will be made based on, but not limited to, some terminologies. And, other random terminologies may be designated to refer to the same meaning. Wherever possible, the same reference numbers will be used throughout the drawings to refer to the same or like parts.

Also, terminologies described in this specification and claims should not be interpreted as general or dictionary definition and are provided to assist understanding of the present invention within the range that they do not depart from technical spirits of the present invention.

Prior to description of the present invention, an evolved universal mobile telecommunications system (E-UMTS), which is the technical field of the present invention, and its technical features will be described as follows.

Figure 1:
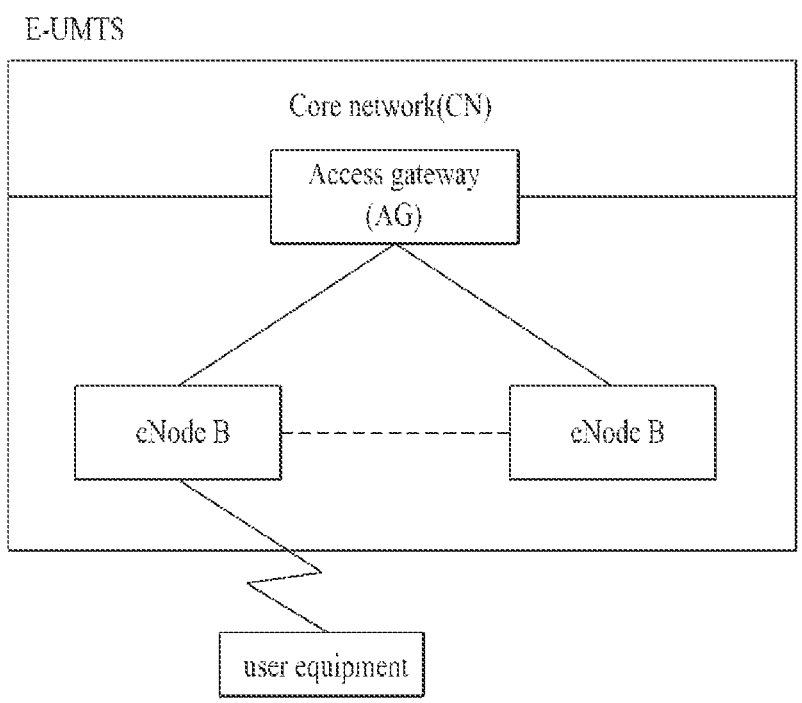
FIG. 1 is a diagram conceptionally illustrating a network structure of an Evolved Universal Mobile Telecommunications System (E-UMTS)
Figure 2:
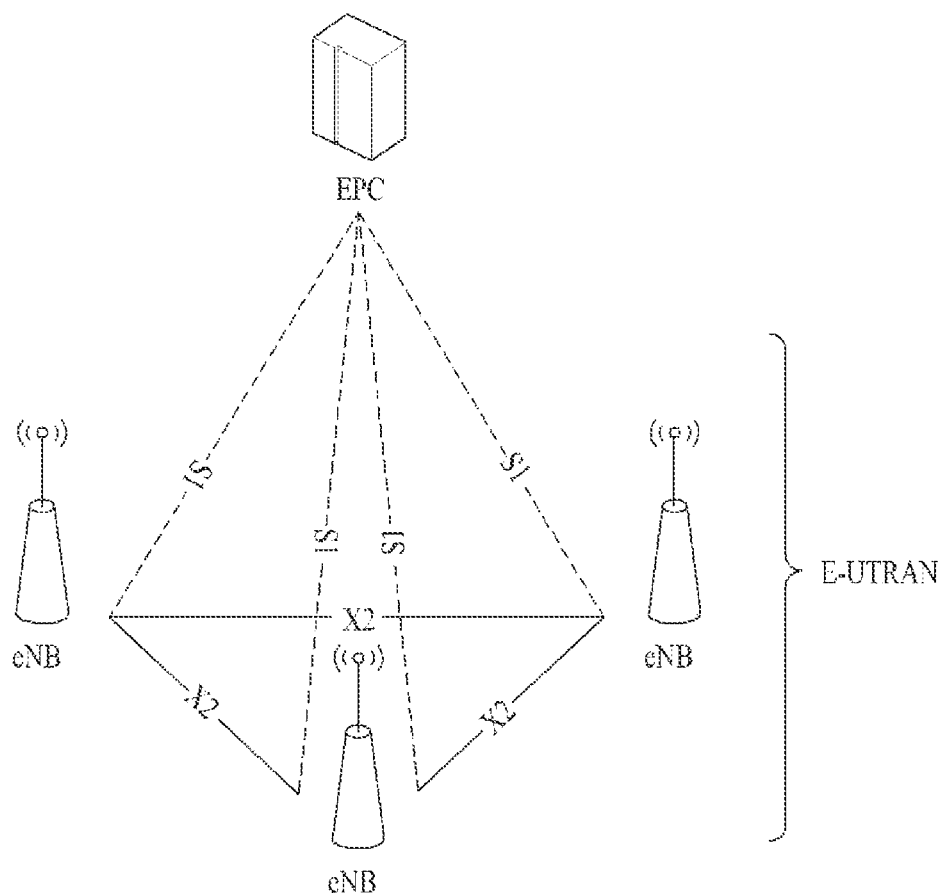
FIG. 2 is a diagram conceptionally illustrating a network structure of an evolved universal terrestrial radio access network (E-UTRAN)

FIG. 2 is a diagram conceptionally illustrating a network structure of an evolved universal terrestrial radio access network (E-UTRAN). In particular, the E-UTRAN system is a system evolving from the conventional UTRAN system. The E-UTRAN includes cells (eNB), wherein the respective cells are connected with each other through an interface X2. Also, each of the cells eNBs is connected with a user equipment through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment, wherein the access information or the ability information is mainly used for mobility management of the user equipment. The S-GW is a gateway having the E-UTRAN as an end point, and the PDN-GW is a gateway having a packet data network (PDN) as an end point.

The user equipment performs a cell selection procedure to receive a service from the cell, and registers itself with a network. Also, if signal strength or signal quality between the user equipment and the cell is deteriorated due to mobility of the user equipment, the user equipment performs a cell reselection procedure to maintain transmission quality of data.

In the 3GPP standard document TS 36.304, two types of cell selection procedures are defined as follows.

First of all, one of the cell selection procedures is an initial cell selection procedure. The initial cell selection procedure is performed when the user equipment does not have advance information on a radio channel. In this case, the user equipment searches for all the radio channels to discover a proper cell, and selects a cell corresponding to a radio channel having the strongest signal quality from the searched radio channels.

The other one of the cell selection procedures is a stored information cell selection procedure. The stored information cell selection procedure is performed when the user equipment previously stores information on a radio channel. In this case, since the user equipment has already information on a radio channel, it may select a cell more quickly than the aforementioned initial cell selection procedure.

Figure 3:
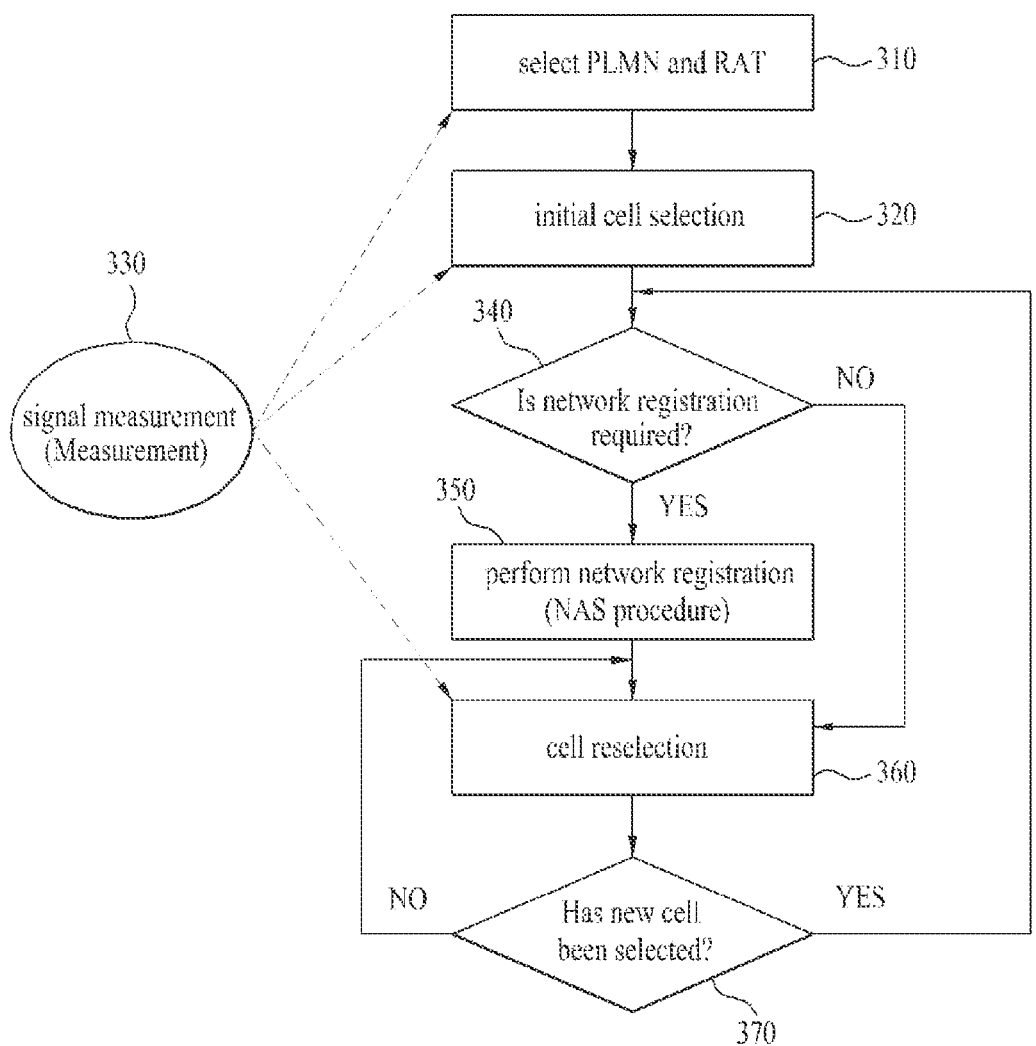
FIG. 3 is a flow chart illustrating an operation of a user equipment when the user equipment is powered on in a long term evolution (LTE) system.

FIG. 3 is a flow chart illustrating an operation of a user equipment when the user equipment is powered on in a long term evolution (LTE) system.

Referring to FIG. 3, the user equipment selects a public land mobile network (PLMN) and radio access technology (RAT) for communication automatically or passively when it is powered on at step 310, wherein the PLMN is the network desired by the user equipment to receive a service. The PLMN and RAT information may be selected by a user of the user equipment. Also, information stored in a universal subscriber identity module (USIM) may be used as the PLMN and RAT information. In this case, the user equipment measures a signal transmitted from the cell periodically or non-periodically, that is, reference signal or pilot signal at step S330, and obtains cell quality information by using features of a physical signal related to signal strength or a signal to noise/interference ratio.

Afterwards, the user equipment performs a cell selection procedure for selecting a cell having the greatest value from cells having the measured cell quality information greater than a reference value at step 320. The reference value means a value defined in the system to assure quality of a physical signal in data transmission and reception. Accordingly, the reference value may be varied depending on the applied RAT and may depend on the following Equation 1 in the LTE system.

Then, the user equipment receives system information periodically transmitted from the cell, and registers its information (for example, international mobile subscriber identity (IMSI)) with a network to receive a service from the network at step 350. The user equipment does not register its information with the network whenever selecting a cell but registers its information with the network when information (for example, tracking area identify (TAI) of the network, which is received from the SI, is different from information of the network known by itself, like steps 340 and 370.

Also, if signal strength or signal quality measured from a serving cell is lower than that measured from a neighboring cell, the user equipment reselects one of other cells that provide signal feature better than that of a cell accessed by the user equipment at step 360. This procedure will be referred to as a cell reselection procedure classified from the cell selection procedure of the step 320.

Meanwhile, in the 3GPP standard document TS 36.304, services provided from the E-UTRAN to the user equipment are classified into three types as follows.

TABLE 1

| | |
|---|---|
| Limited service | Provides Emergency call and ETWS (Earthquake and Tsunami Warning System). |
| Normal service | Provides service of public use. |
| Operator service | Provides service for communication network provider. |

Also, in the 3GPP standard document TS 36.304, cell types are classified as follows in respective of service types provided from the cell to the user equipment.

TABLE 2

| | |
|---|---|
| Acceptable cell | Cell where user equipment may receive limited service |
| Suitable cell | Cell where user equipment may receive normal service. |
| Barred cell | Cell designated as barred cell in system information. |
| Reserved cell | Cell designated as reserved cell in system information. |

In this case, the acceptable cell is the cell that is not barred and satisfies a cell selection basis of the user equipment, and receives only a limited service such as emergency call and ETWS.

Also, the suitable cell satisfies the conditions of the acceptable cell, and at the same time satisfies additional conditions. The additional conditions are that the corresponding user equipment should belong to the PLMN and a TA update procedure of the user equipment should not be barred. If the corresponding cell is a closed subscriber group (CSG) cell, the suitable cell should be a cell that may be accessed by the user equipment as a CSG member.

For reference, in the 3GPP standard document TS 25.304, services and cell types provided from the UTRAN to the user equipment are defined. In the 3GPP standard document TS 43.022, services and cell types provided from a global system for mobile communication (GSM) to the user equipment are defined. In particular, limited services provided by the UTRAN and the GSM support emergency call only except for the ETWS.

The following Equation 1 represents a cell selection basis in the LTE system disclosed in the 3GPP standard document TS 36.304.

$$Srxlev = Q_{rxlevmeas} - (Q_{rxlevmin} + Q_{rxlevminoffset}) - Pcompensation > 0 \quad \text{[Equation 1]}$$

Parameters used in the Equation 1 are as follows.

TABLE 3

| | |
|---|---|
| $Q_{rxlevmeas}$ | Receiving level of measured cell (RSRP). |
| $Q_{rxlevmin}$ | Minimum receiving level (dBm) required in cell |
| $Q_{rxlevminoffset}$ | Offset for $Q_{rxlevmin}$ |
| Pcompensation | $\max(P_{EMAX} - P_{UMAX}, 0)$ (dB) |
| $P_{EMAX}$ | Maximum transmission power (dBm) of user equipment to corresponding cell |
| $P_{UMAX}$ | Maximum transmission power (dBm) of radio frequency module of user equipment |

The user equipment receives the parameters of Table 3 through system information (SI), and performs the cell selection procedure by using the cell selection basis of the Equation 1.

In the mean time, the aforementioned system information includes essential information that should be known by the user equipment to access a cell. Accordingly, the user equipment should have the latest system information before accessing the cell. Also, since the system information is the information that should be known by all the user equipments within one cell, the cell transmits the system information periodically.

Such system information is divided into a master information block (MIB), a scheduling block (SB), and a system information block (SIB). The MIB allows the user equipment to know physical configuration of the corresponding cell, for example, bandwidth information. The SIB is the aggregation of related system information. For example, some SIB includes only information of peripheral cells, and another SIB includes only information of an uplink radio channel used by the user equipment. The SB indicates transmission information of the SIBs, for example, transmission period.

In the mean time, after the user equipment selects a cell through the cell selection procedure, signal strength or signal quality between the user equipment and the cell may be changed due to mobility of the user equipment or change of a radio environment. If quality of the selected cell is deteriorated, the user equipment may select another cell that provides better quality. If the user equipment reselects such a cell, it selects a cell that provides signal quality better than that of the currently selected cell. This will be referred to as a cell reselection procedure.

The cell reselection procedure is basically intended to select a cell that provides the best quality to the user equipment, in view of quality of a radio signal. In addition to quality of the radio signal, the network may determine priority per frequency and notify the user equipment of the determined priority. The user equipment that has received the priority first considers the priority prior to quality basis of the radio signal for the cell reselection procedure. The cell reselection procedure may be classified as illustrated in Table 4 below in accordance with the RAT and frequency features of the cell.

TABLE 4

| | |
|---|---|
| Intra-frequency cell reselection | Reselection of cell having the same RAT and the same center-frequency as those of serving cell |
| Inter-frequency cell reselection | Reselection of cell having RAT and center-frequency different from those of serving cell |
| Inter-RAT cell reselection | Reselection of cell having RAT different from that currently used by serving cell |

Cell reselection is performed on the basis of the cell reselection basis. The cell reselection basis has the following features in respect of measurement of a serving cell and a neighboring cell.

First of all, the intra-frequency cell reselection is basically based on ranking. In this case, ranking means that index values for cell reselection assessment are defined and index values of cells are ranked in the order of size using the defined index values. In this case, the cell having the best index will be referred to as the best ranked cell. Also, the cell index value is obtained by applying frequency offset or cell offset, if necessary, on the basis of the value measured by the user equipment for the corresponding cell.

Second, the inter-frequency cell reselection is based on frequency priority provided by the network. The user equipment tries to camp on the frequency having the highest frequency priority. The network may provide frequency priority to be commonly applied to user equipments within a cell through broadcast signaling, or may provide priority per frequency to each user equipment through user equipment specific signaling. Also, for the inter-frequency cell reselection, the network may provide parameters used for cell reselection to the user equipment per frequency.

Third, for the intra-frequency or inter-frequency cell reselection, the network may provide a neighboring cell list (NCL) used for cell reselection to the user equipment. The neighboring cell list includes a cell specific parameter used for cell reselection.

Finally, for the intra-frequency or inter-frequency cell reselection, the network may provide a cell reselection black list used for cell reselection to the user equipment. The user equipment does not perform cell reselection for the cell included in the black list.

Subsequently, ranking performed for the cell reselection assessment procedure will be described. Index values of cells, which are used to rank the cells, are defined as expressed by the following Equation 2, and parameters used in the Equation 2 are illustrated in Table 5 below. In this case, a subscript 's' means a serving cell, and a subscript 'n' means a neighboring cell.

$$R_s = Q_{meas,s} + Q_{Hyst}$$

$$R_n = Q_{meas,n} + Q\text{offset} \qquad \text{[Equation 2]}$$

TABLE 5

| | |
|---|---|
| $Q_{meas}$ | Quality value measured by user equipment for corresponding cell |
| Qoffset | Intra-frequency:<br>If user equipment receives offset value, Qoffset$_{s,\ n}$ between serving cell and specific neighboring cell, Qffoset = Qoffset$_{s,\ n}$<br>If user equipment does not receive offset value, Qoffset$_{s,\ n}$ for corresponding cell, Qoffset = 0 is applied.<br>Inter-frequency:<br>If user equipment receives offset, Qoffset s, n for corresponding cell, Qoffset = Qoffset$_{s,\ n}$ + Qfrequency<br>If user equipment does not receive offset value, Qoffset$_{s,\ n}$ for corresponding cell, Qoffset = Qfrequency |
| $Q_{hyst}$ | If cell reselection index value (Rs) of serving cell and cell reselection index value (Rn) of neighboring cell are changed similarly, ranking is changed frequently, whereby user equipment may reselect two cells alternately. This parameter is to prevent two cells from being alternately reselected by user equipment. |

The user equipment measures $R_s$ of the serving cell and $R_n$ of the neighboring cells in accordance with the Equation 2, regards the cell having the greatest R value as the best rank cell and reselects the corresponding cell. This will be referred to as R-criterion. According to definition for the R, it is noted that cell quality acts as the most important criterion in cell reselection based on the R-criterion. Cell reselection is performed only if comparison should be maintained for a time period $T_{reselection}$ during comparison of the R values. If the reselected cell is not the suitable cell, the user equipment excludes the corresponding frequency or the corresponding cell from targets for cell reselection.

Subsequently, speed scaling that affects cell reselection in accordance with a user equipment speed state will be described. If the user equipment passes cells at high speed, problem occurs in that cell reselection is not performed exactly, and the user equipment may not camp on a specific cell. These problems occur due to the $T_{reselection}$ time for preventing cell reselection from occurring unnecessarily. A radio state of a neighboring cell, which is measured by the user equipment for the $Tr_{eselection}$ time, should be higher than a specific value. However, a problem occurs in that the cell reselection condition may not be satisfied by the existing $T_{reselection}$ if moving speed of the user equipment is fast. If the moving speed state of the user equipment is changed, speed scaling is intended to reduce $T_{reselection}$, whereby cell reselection is performed even at the fast moving speed. The speed state change of the user equipment is determined in such a manner that the number of times for cell reselection for a certain time period is compared with a specific value.

FIG. 4 is a diagram illustrating structures of a control plane and a user plane (U-Plane, User-Plane) of a radio interface protocol between a user equipment and E-UTRAN based on the 3GPP radio access network standard. In particular, the radio interface protocol horizontally includes a physical layer, a data link layer, and a network layer, and vertically includes a user plane for data information transfer and a control plane for control signal transfer.

Also, the protocol layers in FIG. 4 may be classified into L1 (first layer), L2 (second layer), and L3 (third layer) based on three lower layers of the open system interconnection (OSI) standard model widely known in the communications systems.

The control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

A physical layer corresponding to the first layer provides an information transfer service to an upper layer using a physical channel. The physical layer is connected to a medium access control (MAC) layer above the physical layer through a transport channel. Data are transferred between the MAC layer and the physical layer through the transport channel. Also, data are transferred between physical layers of a transmitting side and a receiving side through a physical channel. The physical channel is modulated in accordance with an orthogonal frequency division multiplexing (OFDM) scheme, and uses time and frequency as radio resources.

A MAC layer of the second layer provides a service to a radio link control (RLC) layer corresponding to its upper layer through a logical channel. The RLC layer of the second layer supports reliable data transmission. A function of the RLC layer may be implemented by a functional block within the MAC layer. In this case, the RLC layer may not exist. In order to effectively transmit IP packets such as IPv4 or IPv6 within a radio interface having a narrow bandwidth, a PDCP (packet data convergence protocol) layer of the second layer performs header compression to reduce unnecessary control information.

A radio resource control (RRC) layer located on the lowest part of the third layer is defined in the control plane only and is associated with configuration, re-configuration and release of radio bearers (RBs) to be in charge of controlling the logical, transport and physical channels. The radio bearer means a service provided by the second layer for data transfer between the user equipment and the E-UTRAN. To this end, the RRC layer allows the user equipment and the network to exchange RRC message with each other.

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC connected state, on the basis of cell unit, it may effectively control the user equipment. On the other hand, the E-UTRAN may not identify the user equipment which is in the RRC idle state, on the basis of cell unit. In this case, the user equipment is managed by the core network (CN) on the basis of TA unit which is a local unit greater than the cell unit. In other words, in order that the user equipment which is in the RRC idle state receives a service such as voice or data, the user equipment should be shifted to the RRC connected state.

In particular, when the user initially turns on the power of the user equipment, the user equipment searches for a proper cell and then is maintained in the RRC idle state in the corresponding cell. The user equipment maintained in the RRC idle state performs RRC connection establishment with the RRC layer of the E-UTRAN only if the RRC connection is required, and then is shifted to the RRC connected state. In this case, the case where the RRC connection is required may include a case where uplink data transmission is required due to calling attempt of the user or a case where a response message to a paging message transmitted from the E-UTRAN should be transmitted.

As described above, since the cell selection procedure is performed by the user equipment in a state that the user equipment does not determine a cell maintained in the RRC idle state, it is more important that cell selection is performed quickly if possible. Accordingly, a cell that provides radio signal quality greater than a certain criterion may be selected by the cell selection procedure of the user equipment even though the cell is not the cell that provides the best radio signal quality, that is, even though the cell is the acceptable cell not the suitable cell.

In the mean time, if normal communication cannot be performed due to quality degradation of the radio channel or difference in establishment between the user equipment and the network, the user equipment determines that there is a problem in the current communication link and starts RRC connection reestablishment procedure.

The 3GPP standard document TS 36.331 discloses examples of the case where normal communication cannot be performed, as follows: the case where the user equipment determines that there is a serious problem in downlink communication link quality on the basis of the radio quality measurement result of the physical layer of the user equipment; the case where the user equipment determines that there is a serious problem in uplink transmission due to continuous failure of a random access procedure in the MAC sub layer or continuous failure of uplink data transmission in the RLC sub layer; the case where the user equipment determines that handover has been failed; and the case where a message received by the user equipment does not pass an integrity check.

A non-access stratum (NAS) layer located above the RRC layer in (a) of FIG. 4 performs functions such as session management and mobility management. For mobility management of the user equipment, two types of states, an EPS mobility management registered (EMM-REGISTERED) state and an EMM unregistered (EMM-UNREGISTERED) state are defined in the NAS layer. These two states are applied to the user equipment and the MME. The user equipment is initially in the EMM-unregistered state, and performs a registration procedure with the corresponding network through an initial attach procedure to access the network. If the initial attach procedure is successfully performed, the user equipment and the MME are in the EMM registered state.

Also, in order to manage signaling connection between the user equipment and the EPC, two types of states, an EPS connection management (ECM) idle (ECM_IDLE) state and an ECM connected (ECM_CONNECTED) state are defined in the NAS layer. These two states are applied to the user equipment and the MME. If the user equipment of the ECM idle state is RRC connected with the E-UTRAN, the corresponding user equipment is in the ECM connected state. The MME which is in the ECM idle state is S1 connected with the E-UTRAN, it is in the ECM connected state.

When the user equipment is in the ECM idle state, the E-UTRAN does not have context of the user equipment. Accordingly, the user equipment which is in the ECM idle state performs a user equipment based mobility related procedure such as cell selection or cell reselection without any command from the network. On the other hand, when the user equipment is in the ECM connected state, mobility of the user equipment is managed by the command of the network. If the position of the user equipment is different from that known by the network in the ECM idle state, the user equipment notifies the network of its position through a tracking area (TA) update procedure.

Next, HeNB (or HNB) will be described. A mobile communication service may be provided through a base station owned by a person or a specific provider or group in addition to a mobile communication network provider. This base station will be referred to as home NB (HNB) or home eNB (HeNB). The HeNB is basically intended to provide a specific service to a closed subscriber group (CSG) only. However, the HeNB may provide a service to other users in addition to the CSG in accordance with its operation mode establishment.

Figure 5:
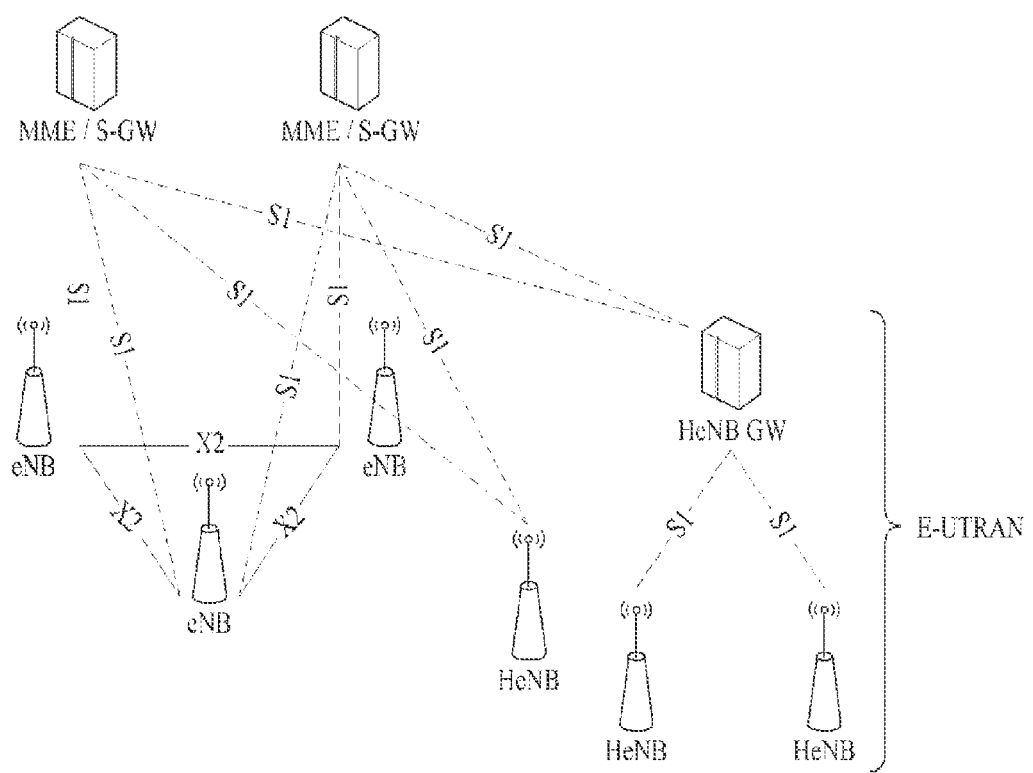
FIG. 5 is a diagram illustrating a configuration of a wireless communication system that includes HeNB.

FIG. 5 is a diagram illustrating a configuration of a wireless communication system that includes HeNB.

Referring to FIG. 5, the E-UTRAN may manage a HeNB gateway (GW) to provide a service to the HeNB. The HeNBs are connected to the EPC through the HeNB GW, or are directly connected to the EPC. The HeNB GW is recognized by the MME as a normal cell, and is also recognized by the HeNB as the MME. Accordingly, the HeNB is connected with the HeNB GW through an interface S1, and the HeNB GW is connected with the EPC through the interface S1.

Generally, as compared with the eNB owned by the mobile communication network provider, the HeNB has lower radio transmission output. Accordingly, it is general that a service coverage provided by the HeNB is smaller than a service coverage provided by the eNB. The cell provided by the HeNB is regarded as a femto cell in view of the service coverage as compared with a macro cell provided by the eNB. Meanwhile, when the HeNB provides a service to the CSG only in view of the service, the cell provided by the HeNB will be referred to as a CSG cell.

Each CSG has its unique identification number, and the identification number will be referred to as CSG ID (CSG identity). The user equipment has a list of CSGs to which the user equipment belongs as a member, and the list of CSGs may be changed by request of the user equipment or command of the network. Generally, one HeNB may support one CSG.

The HeNB transfers CSG ID of a CSG through system information, whereby a user equipment corresponding to a member of the corresponding CSG accesses the corresponding cell. In this case, the CSG is supported by the HeNB. When the user equipment discovers the CSG cell, it may identify a CSG supported by the CSG cell by reading out CSG ID included in the system information. The user equipment that has read out the CSG ID regards the corresponding cell as an accessible cell only if it is a member of the corresponding CSG cell.

In the mean time, the HenB does not need to always allow access to the CSG user equipment only. The HeNB may allow access of the user equipment which is not the CSG member, in accordance with its configuration establishment. A user equipment allowed for access may be changed depending on establishment of the operation mode of the HeNB. The operation mode of the HeNB is classified as illustrated in Table 6 below depending on a user equipment that receives a service.

TABLE 6

| | |
|---|---|
| Closed access mode | Mode that provides a service to a specific CSG member only. HeNB provides CSG cell. |
| Open access mode | Mode that provides a service without restriction limited to a specific CSG member, like normal eNB. HeNB provides a normal cell not the CSG cell. |
| Hybrid access mode | Mode that may provide a CSG service to a specific CSG member and provides a service to a non-CSG member like a normal cell. A cell is recognized by a CSG member UE as a CSG cell, and is recognized by a non-CSG member UE as a normal cell. This cell is referred to as a hybrid cell. |

The HeNB notifies the user equipment whether the cell supported by the HeNB is the CSG cell or the normal cell, whereby the user equipment may know whether it may access the corresponding cell. The HeNB managed by a closed access mode broadcasts that it is the CSG cell, through system information. The HeNB managed by an open access mode broadcasts that it is not the CSG cell, through system information.

As described above, the HeNB includes a CSG indicator of 1 bit in the system information, wherein the CSG indicator indicates whether the cell supported by the HeNB is the CSG cell. For example, the CSG cell sets the CSG indicator to TRUE. If the cell supported by the HeNB is not the CSG cell, the CSG cell may set the CSG indicator to FALSE or may use a method for omitting CSG indicator transmission.

Since the user equipment should identify the normal cell provided by the eNB from the CSG cell, the normal eNB may transmit the CSG indicator, whereby the user equipment may know that the cell provided by the eNB is the normal cell. Also, the normal eNB may not transmit the CSG indicator, so as to allow the user equipment to know that the cell type provided by the eNB is the normal cell.

Table 7 illustrates CSG related parameters transmitted from the corresponding cell per cell type. Also, Table 8 illustrates types of user equipments that are allowed for access per cell type.

TABLE 7

| | CSG cell | Normal cell |
|---|---|---|
| CSG indicator | Indicates CSG cell. | Indicates Non-CSG cell or does not transmit CSG indicator. |
| CSG identifier | Transmits supported CSG identifier | Does not transmit CSG identifier. |

TABLE 8

| | CSG cell | Normal cell |
|---|---|---|
| User equipment that does not support CSG | No access | Access allowed |
| Non-CSG member user equipment | No access | Access allowed |
| CSG member user equipment | Access allowed | Access allowed |

Figure 6:
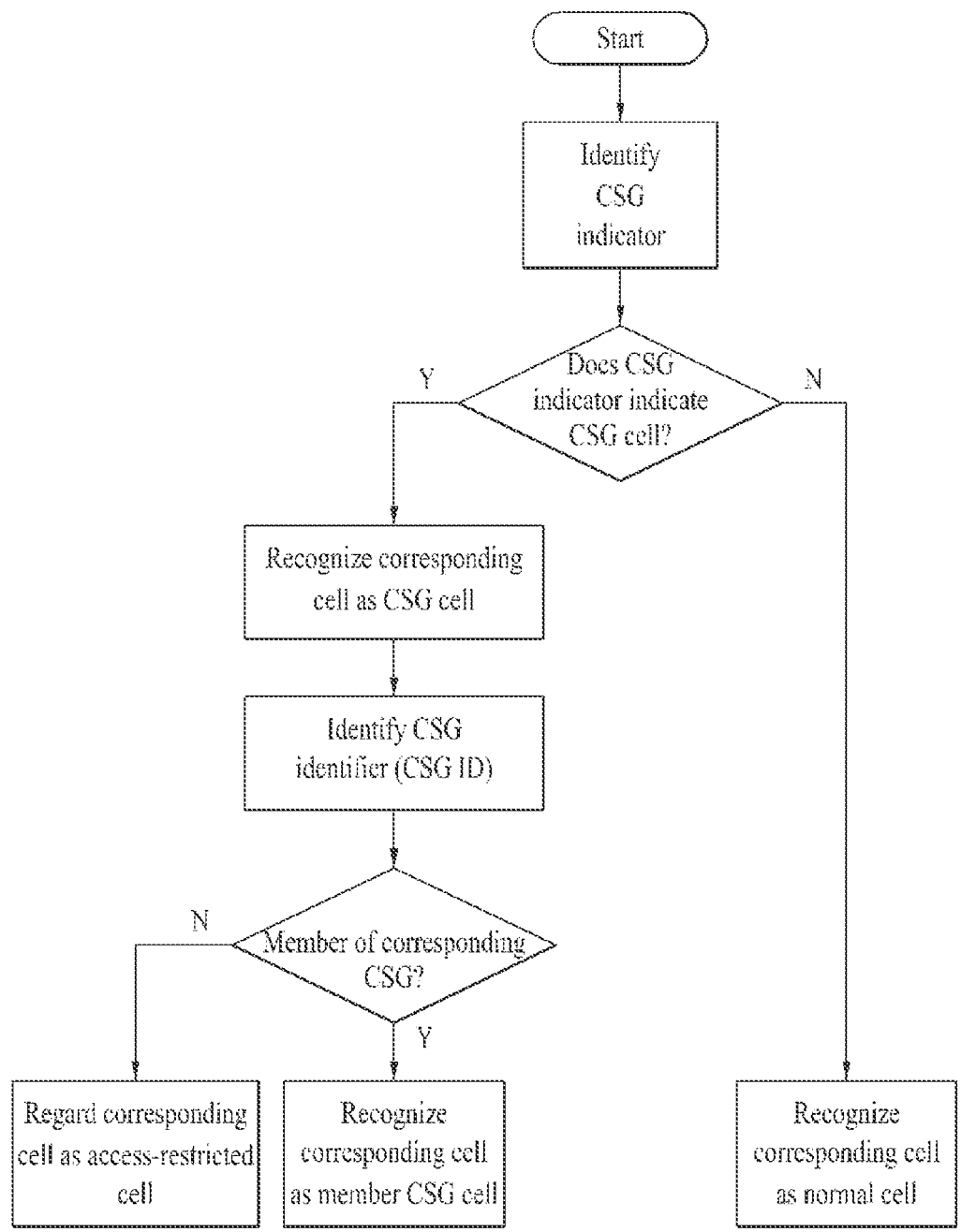
FIG. 6 is a flow chart illustrating that a user equipment of a wireless communication system identifies a type of a cell by using a CSG indicator.

FIG. 6 is a flow chart illustrating that a user equipment of a wireless communication system identifies a type of a cell by using a CSG indicator.

Referring to FIG. 6, the user equipment identifies a CSG indicator included in system information of a target cell to identify a cell type of the target cell, and recognizes the corresponding cell as a CSG cell if the CSG indicator indicates that the target cell is the CSG cell. Also, the user equipment identifies a CSG identifier included in the system information to identify whether the user equipment is a CSG member of the target cell.

Subsequently, if the user equipment identifies, through the CSG identifier, that it is the CSG member of the target cell, it recognizes the corresponding cell as the accessible CSG cell. If the user equipment identifies, through the CSG identifier, that it is not the CSG member of the target cell, it recognizes the corresponding cell as the non-accessible CSG cell.

In the mean time, if the CSG indicator indicates that the target cell is not the CSG cell, the user equipment recognizes the target cell as the normal cell. Also, if the CSG indicator is not transmitted, the user equipment recognizes the corresponding cell as the normal cell.

The CSG cell and a normal macro cell may be managed by some frequency. Hereinafter, this frequency will be defined as a mixed carrier frequency. The network may separately reserve specific physical layer cell identifiers for the CSG cell from the mixed carrier frequency. The CSG cell notifies the user equipment of information on physical cell identities (PCIs), which are reserved for the CSG at the current frequency, through the system information at the mixed carrier frequency. The user equipment that has received this information may determine whether a cell discovered at the corresponding frequency is the CSG cell or may not be the CSG cell, through the PCI of the cell. How to use this information will be described in respect of two types of user equipments.

If the user equipment does not support a CSG related function or does not have a list of CSGs to which the user equipment belongs as a member, it does not need to regard the CSG cell as a selectable cell during the cell selection and reselection procedures. In this case, the user equipment may identify the PCI only of the cell, and if the PCI is that reserved for the CSG, the user equipment may exclude the corresponding cell from the cell selection and reselection procedures. Generally, PCI of a cell may be identified directly during the step of allowing the physical layer of the user equipment to identify the presence of the corresponding cell.

In the meantime, if the user equipment has the list of CSGs to which the user equipment belongs as a member, to know a list of peripheral CSG cells at the mixed carrier frequency, it may identify that the corresponding cell is the CSG cell by discovering the cell having the PCI reserved for the CSG instead of identifying CSG identifiers of the system information of all the cells discovered within the range of all the PCIs.

Next, a cell reselection procedure related to the CSG cell will be described. The CSG cell is that for supporting a better service to the corresponding CSG member user equipment. Accordingly, when the user equipment camps on the CSG cell, it may not be preferable to reselect the cell in view of service quality even though the user equipment discovers an inter-frequency cell having frequency priority higher than that of the serving cell.

In this respect, if a CSG cell of some frequency is determined as the best rank cell at the corresponding frequency in accordance with a cell reselection assessment criterion, the user equipment regards that the priority of the corresponding frequency is higher than the other frequency. In this way, when the user equipment designates that the frequency priority higher than the frequency priority that may be designated by the network for a specific frequency, this frequency priority is referred to as the implicit highest priority.

If the user equipment which camps on the CSG cell reselects the non-CSG cell of the corresponding frequency, it does not regard the corresponding frequency as the implicit highest priority and uses a frequency priority value transferred from the network during the cell reselection assessment.

Also, if the user equipment which camps on the CSG cell discovers another CSG cell corresponding to the best rank at the frequency having the same frequency priority, it may reselect the CSG cell or remain in the CSG cell where the user equipment currently camps on.

Next, an inbound mobility procedure for the CSG will be described. Unlike a normal mobility procedure, the inbound mobility procedure additionally includes identifying information of a target cell from system information of the target cell and reporting the identified information from the user equipment to the serving cell. The procedure of identifying information of a target cell from the system information of the target cell and reporting the identified information from the user equipment to the serving cell has two objects. One of the objects is to solve physical cell ID (PCI)/primary scrambling code (PSC) code contention, and the other one of the objects is for preliminary access check to allow the user equipment to identify whether the user equipment is the CSG cell member corresponding to a handover target and notify the network of the identified information. The PCI/PSC contention means that the network does not know a cell where the network performs handover for the user equipment in a state that one PCI/PSC is used by one or more HeNBs due to lack of PCI/PSC when the one or more HeNBs are provided. As a result, in order to solve the PCI/PSC contention problem and perform the preliminary access check, the user equipment should receive information, which may exactly identify the target cell from the system information of the target cell, before receiving a handover command, and should transmit the received information to the network. Also, the user equipment receives the CSG ID from the system information of the target cell through the preliminary access check and compares the received CSG ID with a list of CSGs to which the user equipment belongs as a member, for example, a CSG white-list. The user equipment identifies whether the user equipment is the CSG member of the target cell, through the above comparison, and reports the identified result to the network.

The user equipment transmits a proximity indicator to the network during the inbound mobility procedure. In this case, the proximity indicator is a message indicating that the user equipment has received a service from the CSG cell corresponding to the handover target by accessing the CSG. The user equipment includes a frequency of the target CSG cell in the proximity indicator. In a state that the target CSG cell exists at the frequency different from that of the serving cell of the user equipment, for example, in an inter-frequency inbound mobility state, the network performs measurement configuration for measurement of the corresponding CSG cell on the basis of the proximity indicator received from the user equipment. The user equipment may start a substantial measurement procedure for the corresponding CSG cell on the basis of the measurement configuration.

As a result, if the user equipment reports to the network that the measurement result is suitable for handover, the network command the user equipment to read out system information of the corresponding CSG cell on the basis of the measurement report. The user equipment starts to read out the system information after receiving the system information reading command from the network. At this time, the user equipment receives CSG related information from the system information of the CSG cell and identifies whether it is a member of the corresponding CSG cell, on the basis of the received CSG related information. Also, the user equipment identifies a global cell identity (GCI) from the system information of the CSG cell. The user equipment transmits CSG ID of the CSG cell, information as to whether the user equipment is the CSG member of the CSG cell, and the GSI of the CSG cell to the network. The network determines whether to perform handover on the basis of the information of the CSG cell received from the user equipment. If the network determines to perform handover, it transmits a handover command to the corresponding CSG cell to the user equipment.

Even in the state that target CSG cell exists at the same frequency as that of the serving cell of the user equipment, for example, even in the intra-frequency inbound mobility state, the user equipment transmits a proximity indicator to the network. The network commands the user equipment to read out the system information on the basis of the proximity indicator. The user equipment may receive the system information reading command from the network only if it transmits the proximity indicator to the network. The user equipment starts to read out the system information after receiving the system information reading information from the network. The later procedure is the same as the aforementioned inter-frequency inbound mobility procedure.

Hereinafter, a search procedure for CSG cells will be described. The user equipment may enter service coverage of CSG cells randomly provided in a macro cell zone. A search method for CSG cells through a user equipment includes a manual search method and an autonomous search method.

First of all, the manual search method will be described. If the user equipment is in the service zone of the CSG cell first visited by the user equipment, the user of the user equipment commands the user equipment to perform manual search for the CSG cells. The user equipment receives system information of the CSG cells discovered by searching for available frequencies. The user equipment transfers names and/or information as to member of the CSG cells received from the system information of the CSG cells to the user of the user equipment. If the user selects a proper CSG cell, the user equipment may receive a service from the selected CSG cell. Also, the user equipment records the position of the CSG cell where it first visits and from which it receives a service. And, the position information of the CSG cell is used to allow the user equipment to automatically search for the corresponding CSG cell when the user equipment again visits the position.

Next, the autonomous search method will be described.

Figure 7:
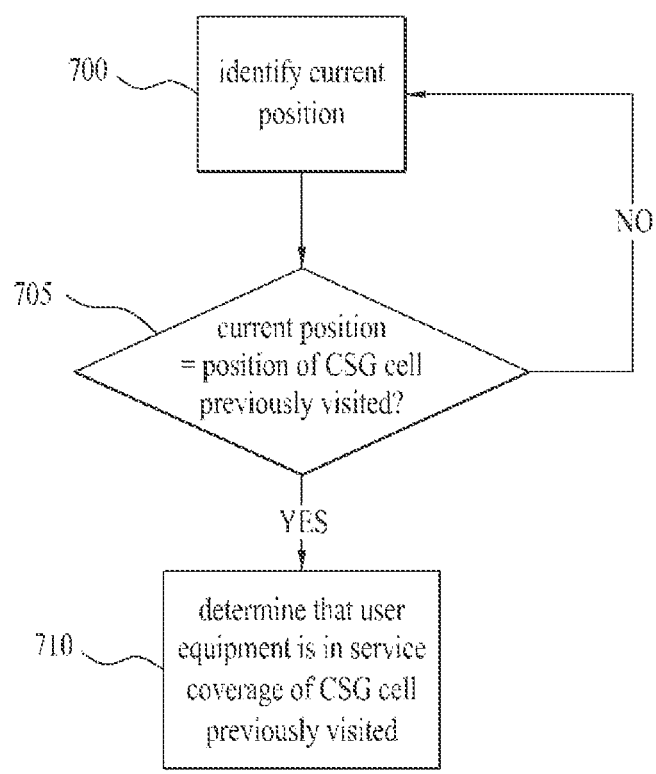
FIG. 7 is a diagram illustrating a general search procedure for CSG cells.

FIG. 7 is a diagram illustrating a general search procedure for CSG cells. First of all, the user equipment identifies its current position at step 700. The user equipment may use a positioning device such as a global navigation satellite system (GNSS) or a global positioning system (GPS) to determine the position information during the procedure of searching for the CSG cells. The user equipment may estimate the current position on the basis of measurement information on macro neighboring cells without the positioning device. For example, the user equipment may associate a position where specific macro neighboring cells having specific signal strength or more may be discovered at a specific frequency, with a specific position. Measurement information of macro neighboring cells for position estimation is referred to as a macro cell finger print. A position estimation method based on the macro cell finger print has a greater error in positioning exactness than that of a method based on a positioning device such as a GPS.

Next, the user equipment compares its current position with the position of the CSG cells where the user equipment has previously visited and from which the user equipment has received a service at step 705. If the current position is the same as the position of the CSG cells where the user equipment has previously visited and from which the user equipment has received a service or is within a certain error range, the user equipment determines that the accessible CSG cell has been detected, at step 710.

According to the related art, if the current position of the user equipment is in the periphery of the CSG cell where the user equipment has previously visited, the user equipment determines that the CSG cell has been detected, without receiving detailed information from the corresponding cell. Accordingly, if a plurality of CSG cells exist within an error range of position measurement used by the user equipment for detection of the CSG cell, the search method for CSG cells through only the position measurement and comparison steps of the user equipment has ambiguity in that the CSG cells determined that the user equipment has currently detected may be random cells of the plurality of cells. In particular, since the method for estimating the position of the user equipment based on the macro cell finger printing has low positioning exactness, the ambiguity problem is serious.

For example, the RRC_IDLE mode user equipment tries reselection for the CSG cell discovered through the autonomous search method. If the CSG cell determined to be detected by the RRC_IDLE mode user equipment is the cell first visited by the user equipment not the cell previously visited by the user equipment and the user equipment is not the member of the CSG cell, the corresponding cell reselection procedure after the autonomous search is failed.

Also, if the RRC_CONNECTED mode user equipment has detected the CSG cell through the autonomous search, it transmits the proximity indicator to the serving base station. If the CSG cell detected by the RRC_CONNECTED mode user equipment through the CSG cell autonomous search is not the cell previously visited by the user equipment, the user equipment transmits a wrong proximity indicator to the network. In this case, a problem occurs in that the network which has received the wrong proximity indicator unnecessarily commands the user equipment to receive and report quality and system information of the corresponding CSG cell.

Moreover, if the CSG cell existing in a specific position intends to function as a new cell by changing the physical layer identifier (for example, PCI), the user equipment should not recognize the CSG cell as the previously visited cell when it revisits this position even though it has previously visited the corresponding CSG cell at the same position. However, according to the related art, the user equipment fails to sense change of the physical layer identifier of the CSG cell existing in the same position. As a result, the RRC_IDLE mode user equipment fails to reselect the CSG cell. Also, the RRC_CONNECTED mode user equipment transmits the wrong proximity indicator to the network, whereby it receives and reports unnecessary measurement and system information.

In order to solve the aforementioned problems, the present invention suggests that CSG cell search should be performed through the following procedure.

First of all, when the user equipment is located in the periphery of the CSG cell, the corresponding CSG cell is searched through manual search of the user of the user equipment and then information on the corresponding CSG cell is stored. The stored information includes the identification position of the corresponding cell and additional information on the corresponding cell. The information on the identification position of the corresponding cell may be position identification information through the positioning device such as GPS or GNSS, or may be measurement information on neighboring cells such as a macro cell finger print. Also, the additional information of the cell necessarily includes a physical layer identifier (PCI or PSC) of the cell. The additional information of the cell may further include CSG ID of the corresponding cell and/or information as to whether access to the corresponding cell is possible (for example, CSG member or non-CSG member). Moreover, the additional information of the cell may include upper layer cell identifier (for example, Cell Identity or Global Cell Identity) of the CSG cell and information such as frequency where the CSG cell is located.

Next, if the CSG cell white list is not empty or information on a CSG cell previously visited and stored by the user equipment is not empty, the user equipment performs an autonomous search function for the CSG cell. First of all, the user equipment determines its current position in the middle of movement. The user equipment may use the positioning device such as GPS or GNSS to determine its current position, or may use measurement information on neighboring cells such as the macro cell finger print.

If the current position of the user equipment, which is determined through the above procedure, is the same as the position of the CSG cell, which is stored by the user equipment, or if an error between the current position of the user equipment, which is determined through the above procedure, and the position of the CSG cell, which is stored by the user equipment, is within a certain range, the user equipment determines that the corresponding CSG cell may provisionally exist within the current position.

If the user equipment determines that the CSG cell may exist provisionally within the current position, it tries measurement of the physical layer identifier for the corresponding cell. At this time, the information on the corresponding CSG cell stored in the user equipment may be used for effective measurement. The user equipment compares the measured physical layer identifier with the physical layer identifier of the CSG cell stored therein. If the measured physical layer identifier is the same as that of the CSG cell determined by the user equipment to exist provisionally, the user equipment determines that it is currently in the service coverage of the CSG cell previously visited and allowed for access.

In order to identify the CSG cell more exactly, the user equipment may additionally receive system information of the corresponding CSG cell in addition to the physical layer identifier and compare the received system information with the information on the CSG cell stored therein. In particular, it is preferable to consider an upper layer cell identifier (for example, Cell Identity or Global Cell Identity) of the CSG cell, which is included in the system information of the CSG cell, as a comparable target.

If the information stored for the CSG cell is the same as the information directly received from the CSG cell, the user equipment determines that it is currently in the service coverage of the CSG cell previously visited and allowed for access. If the user equipment determines that it is not currently in the service coverage of the CSG cell previously visited and allowed for access through comparison of the physical layer identifier and/or the other CSG cell information, it continues to perform the autonomous search function for the CSG cell.

Figure 8:
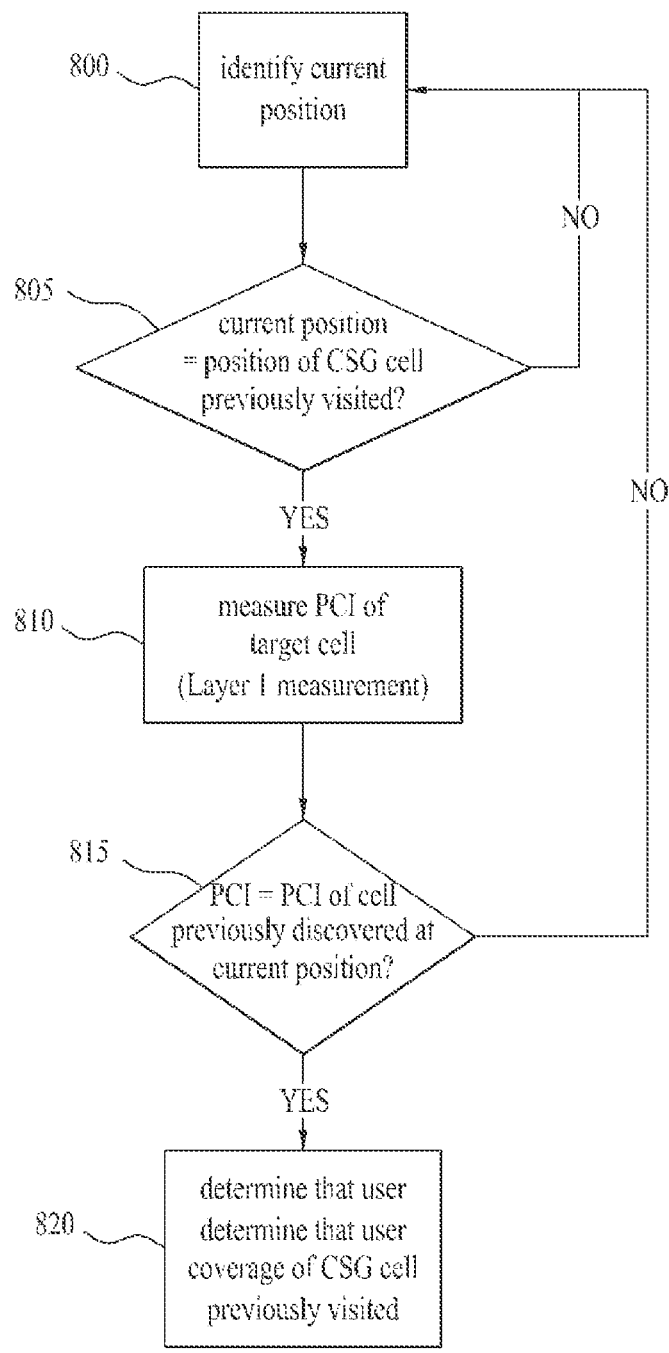
FIG. 8 is a flow chart illustrating an autonomous search for CSG cells in accordance with one embodiment of the present invention.

FIG. 8 is a flow chart illustrating an autonomous search for CSG cells in accordance with one embodiment of the present invention.

First of all, the user equipment identifies its current position at step 800. As described above, the user equipment may use the positioning device such as GPS or GNSS to determine its current position, or may use measurement information on neighboring cells such as the macro cell finger print.

Next, the user equipment compares its current position with the position of the CSG cell, which is stored therein, at step 805. If the current position of the user equipment is the same as the position of the CSG cell, which is stored in the user equipment, the user equipment measures the physical layer identifier for the corresponding cell at step 810.

Subsequently, the user equipment compares the measured physical layer identifier with the physical layer identifier of the CSG cell, which is stored therein, at step 815. If the measured physical layer identifier is the same as the physical layer identifier of the CSG cell, which is stored in the user equipment, the user equipment determines that it is currently in the service coverage of the CSG cell previously visited and allowed for access.

Figure 9:
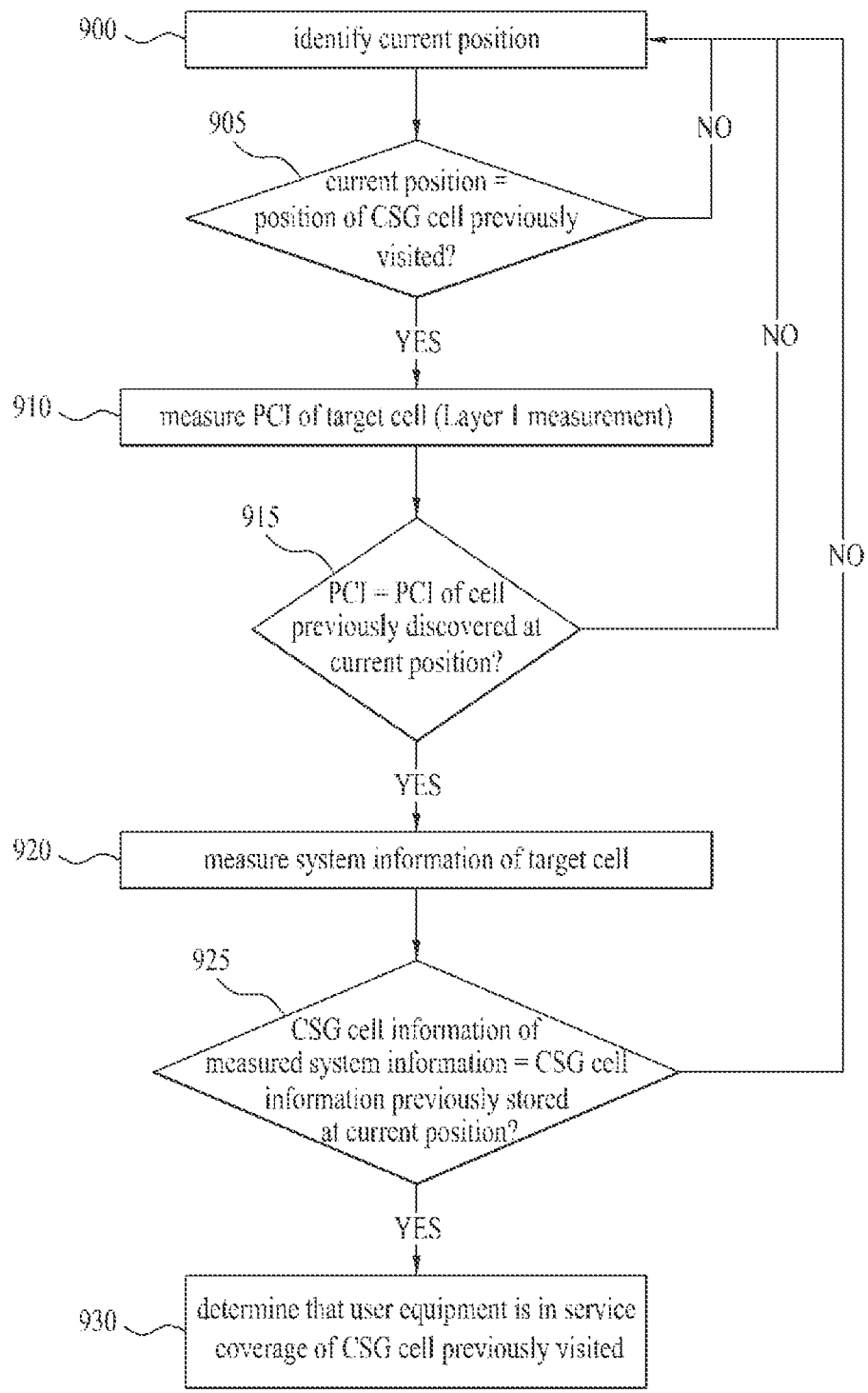
FIG. 9 is a flow chart illustrating an autonomous search for CSG cells in accordance with another embodiment of the present invention.

FIG. 9 is a flow chart illustrating an autonomous search for CSG cells in accordance with another embodiment of the present invention.

Referring to FIG. 9, the user equipment identifies its current position at step 900. The user equipment compares its current position with the position of the CSG cell, which is stored therein, at step 905. If the current position of the user equipment is the same as the position of the CSG cell, which is stored in the user equipment, the user equipment measures the physical layer identifier for the corresponding cell at step 910.

Subsequently, the user equipment compares the measured physical layer identifier with the physical layer identifier of the CSG cell, which is stored therein, at step 915. If the measured physical layer identifier is the same as the physical layer identifier of the CSG cell, which is stored in the user equipment, the user equipment measures and reads out upper layer cell identifier (for example, Cell Identity or Global Cell Identity) of the CSG cell, which is included in system information of the corresponding cell, especially CSG system information, at step 920.

Also, the user equipment determines whether the upper layer cell identifier of the CSG cell, which is included in the measured system information, is the same as the upper layer cell identifier of the CSG cell, which is stored in the user equipment, at step 905. If the upper layer cell identifier of the CSG cell, which is included in the measured system information, is the same as the upper layer cell identifier of the CSG cell, which is stored in the user equipment, the user equipment determines that it is currently in the service coverage of the CSG cell previously visited and allowed for access, at step 930.

Figure 10:
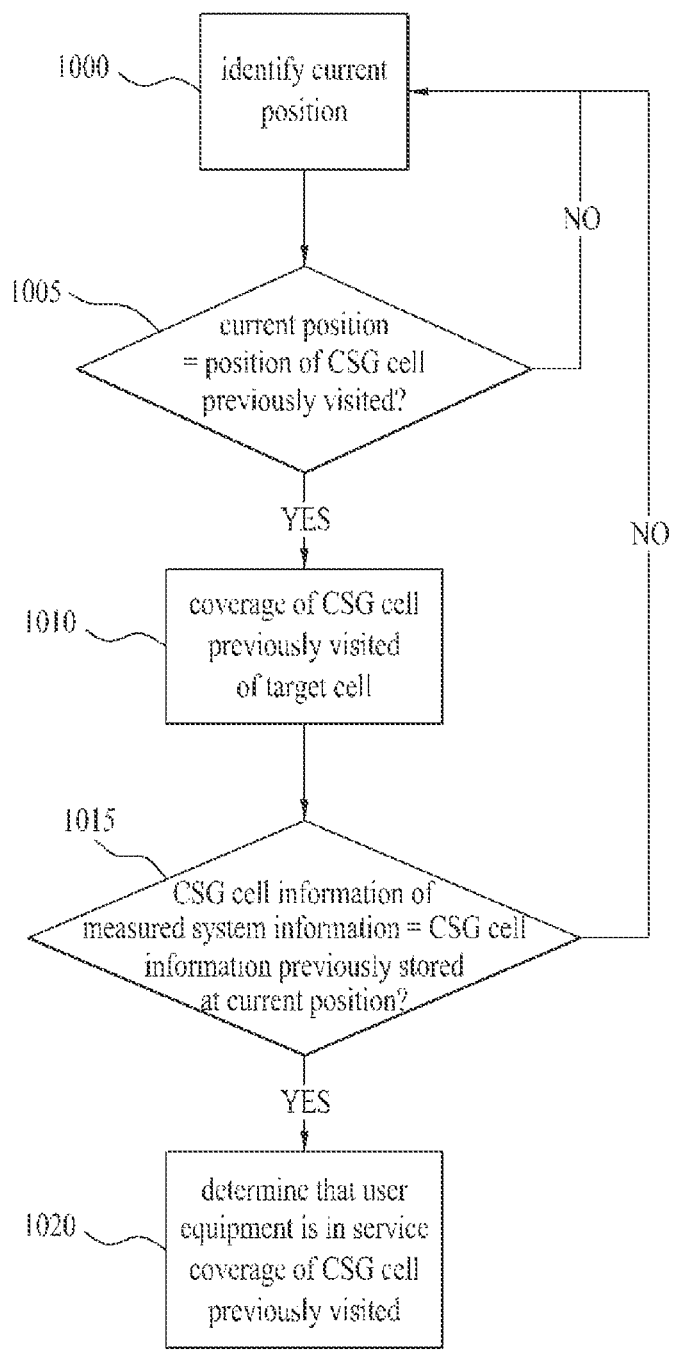
FIG. 10 is a flow chart illustrating an autonomous search for CSG cells in accordance with other embodiment of the present invention.

FIG. 10 is a flow chart illustrating an autonomous search for CSG cells in accordance with other embodiment of the present invention. In particular, although the physical layer identifier of the CSG cell is changed in FIG. 10, if the other CSG cell information is not changed, the method of FIG. 10 may be used to detect the CSG cell.

Referring to FIG. 10, the user equipment identifies its current position at step 1000. The user equipment compares its current position with the position of the CSG cell, which is stored therein, at step 1005. If the current position of the user equipment is the same as the position of the CSG cell, which is stored in the user equipment, the user equipment measures and reads out the upper layer cell identifier (for example, Cell Identity or Global Cell Identity) of the CSG cell included in the system information of the corresponding cell, especially CSG system information, at step 1010.

Subsequently, the user equipment determines whether the upper layer cell identifier of the CSG cell, which is included in the measured system information, is the same as the upper layer cell identifier of the CSG cell, which is stored in the user equipment, at step 1015. If the upper layer cell identifier of the CSG cell, which is included in the measured system information, is the same as the upper layer cell identifier of the CSG cell, which is stored in the user equipment, the user equipment determines that it is currently in the service coverage of the CSG cell previously visited and allowed for access, at step 1020.

The user equipment may detect the CSG cell more exactly through the present invention, wherein the CSG cell may provide the user equipment with a service. Also, if it is difficult for the user equipment to exactly perform position measurement, for example, if the user equipment does not have a positioning device such as GPS or is located in a zone where the user equipment cannot receive a signal of the positioning device, or even through measurement information of a peripheral macro cell, which will be used for position estimation, is restrictive, the user equipment may exactly detect the CSG cell where the user equipment has previously visited and received a service, in accordance with the present invention. Also, according to the present invention, the user equipment may detect the CSG cell, which may provide the user equipment with a service, more exactly and automatically in an environment that the CSG cell may partially change cell information.

Figure 11:
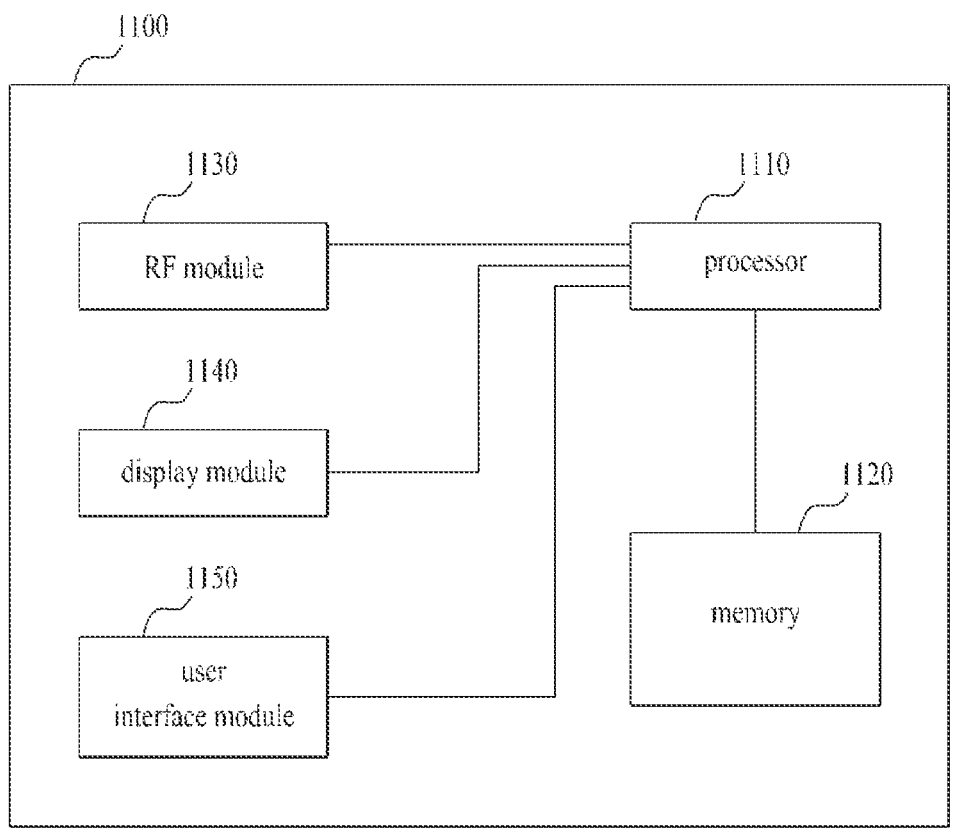
FIG. 11 is a block diagram illustrating a user equipment according to the embodiment of the present invention.

FIG. 11 is a block diagram illustrating a communication transceiver according to the embodiment of the present invention. The transceiver may be a part of the base station or the user equipment.

Referring to FIG. 11, the transceiver 1100 includes a processor 1110, a memory 1120, a radio frequency (RF) module 1130, a display module 1140, and a user interface module 1150.

The transceiver 1100 is illustrated for convenience of description, and some of its modules may be omitted. Also, the transceiver 1100 may further include necessary modules. Moreover, some modules of the transceiver 1100 may be divided into segmented modules. The processor 1110 is configured to perform the operation according to the embodiment of the present invention illustrated with reference to the drawings.

In more detail, if the transceiver 1100 is a part of the base station, the processor 1110 may generate a control signal and map the control signal into a control channel configured within a plurality of frequency blocks. Also, if the transceiver 1100 is a part of the user equipment, the processor 1110 may identify the control channel indicated by the signal received from the plurality of frequency blocks and extract the control signal from the control channel.

Afterwards, the processor 1110 may perform the operation required based on the control signal. The detailed operation of the processor 1110 may be understood with reference to the description of FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Although the method for detecting CSG cells in a wireless communication system and the apparatus therefor have been described based on the 3GPP LTE system, they may be applied to various mobile communication systems in addition to the 3GPP LTE system.

The invention claimed is:

1. A method for detecting closed subscriber group (CSG) cells by a user equipment in a wireless communication system, the method comprising:
storing information of a CSG cell if the user equipment accesses the CSG cell in accordance with a request of a user, wherein the CSG cell is discovered by searching available frequencies for the user equipment, and wherein the information includes a frequency of the CSG cell located;
determining a current position of the user equipment;
checking whether or not the current position of the user equipment is the same as a position of the CSG cell, which is previously stored;
measuring, after the checking, a change of a physical layer identifier of a corresponding cell when the current position of the user equipment corresponds to the position of the CSG cell; and
detecting the corresponding cell as the CSG cell, which is previously accessed, when the measured physical layer identifier corresponds to a physical layer identifier of the previously stored CSG cell.

2. The method according to claim 1, wherein detecting the corresponding cell as the CSG cell which is previously accessed includes:
measuring system information of the corresponding cell; and
detecting the corresponding cell as the previously accessed CSG cell when an upper layer cell identifier included in the system information corresponds to an upper layer cell identifier of the previously stored CSG cell.

3. The method according to claim 1, wherein the physical layer identifier is either physical cell ID (PCI) or primary scrambling code (PSC).

4. The method according to claim 2, wherein the upper layer cell identifier is a cell identifier recognized through a radio resource control (RRC) layer.

5. The method according to claim 1, further comprising storing at least the physical layer identifier of the CSG cell or an upper layer cell identifier together with position information of the CSG cell if the user equipment accesses the CSG cell in accordance with a request of the user.

6. A user equipment in a wireless communication system, the user equipment comprising:
a wireless communication module for transmitting and receiving a signal from a peripheral cell; and
a processor comparing a current position of the user equipment with a position of a CSG cell, which is previously stored, and measuring a change of a physical layer identifier of the peripheral cell,
wherein the processor is configured to store information of the CSG cell if the user equipment accesses the CSG cell in accordance with a request of a user, wherein the CSG cell is discovered by searching available frequencies for the user equipment, and wherein the information includes a frequency of the CSG cell located, to determine whether the measured physical layer identifier is the same as a physical layer identifier of the previously stored CSG cell when the current position of the user equipment corresponds to the position of the previously stored CSG cell, and to detect the peripheral cell as the CSG cell, which is previously accessed, when the measured physical layer identifier is the same as the physical layer identifier of the previously stored CSG cell.

7. The user equipment according to claim 6, wherein the processor measures system information of the peripheral cell, and detects the peripheral cell as the previously accessed CSG cell when an upper layer cell identifier included in the system information is the same as an upper layer cell identifier of the previously stored CSG cell.

8. The user equipment according to claim 6, wherein the physical layer identifier is either physical cell ID (PCI) or primary scrambling code (PSC).

9. The user equipment according to claim 7, wherein the upper layer cell identifier is a cell identifier recognized through a radio resource control (RRC) layer.

10. The user equipment according to claim 6, wherein the processor stores at least the physical layer identifier of the CSG cell or an upper layer cell identifier together with position information of the CSG cell if the user equipment accesses the CSG cell in accordance with a request of the user.

* * * * *